(12) United States Patent
Bortnik et al.

(10) Patent No.: US 9,367,543 B2
(45) Date of Patent: Jun. 14, 2016

(54) GAME ACHIEVEMENTS SYSTEM

(71) Applicant: Microsoft Corporation, Redmond, WA (US)

(72) Inventors: Michal Bortnik, Seattle, WA (US); Vincent H. Curley, Bellevue, WA (US); James Hsi-kai Jen, Seattle, WA (US); James David Macauley, Bellevue, WA (US); Ling Tony Chen, Bellevue, WA (US); Steven D. Lamb, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 13/874,945

(22) Filed: May 1, 2013

(65) Prior Publication Data

US 2013/0252738 A1    Sep. 26, 2013

Related U.S. Application Data

(63) Continuation of application No. 13/165,211, filed on Jun. 21, 2011, now Pat. No. 8,454,443, which is a continuation of application No. 13/019,951, filed on Feb. 2, 2011, now Pat. No. 8,323,112, which is a (Continued)

(51) Int. Cl.
*A63F 9/24*       (2006.01)
*A63F 13/00*      (2014.01)
*G06F 17/30*      (2006.01)

(Continued)

(52) U.S. Cl.
CPC .......... *G06F 17/30002* (2013.01); *A63F 13/10* (2013.01); *A63F 13/12* (2013.01); *A63F 13/79* (2014.09); *A63F 13/795* (2014.09); *G06F 17/40* (2013.01); *A63F 2300/556* (2013.01);

(Continued)

(58) Field of Classification Search
CPC ................... A63F 2300/558; A63F 2300/5546
See application file for complete search history.

(56) References Cited

U.S. PATENT DOCUMENTS 5,083,271 A *  1/1992  Thacher .................. A63F 13/12
                                                    340/323 R
5,551,701 A    9/1996  Bouton et al.

(Continued)

FOREIGN PATENT DOCUMENTS

CN    1538339    10/2004
EP    1520608    4/2005

(Continued)

OTHER PUBLICATIONS

Abrash, M.; "Inside Xbox Graphics—A Powerful Game Platform Waiting in the Wings"; drdobbs.com; retrieved at http://www.drdobbs.com/184404199; Aug. 1, 2000; 9 pages.

(Continued)

*Primary Examiner* — Steven J Hylinski
(74) *Attorney, Agent, or Firm* — Aaron Chatterjee; Judy Yee; Micky Minhas

(57) ABSTRACT

Systems and method for providing a game achievements system where players are rewarded with game achievements based on mastering certain in-game facets of the games they play. Each game achievement may be conveyed in a profile as a badge or trophy, title, description, date, etc. Players may also accumulate points based on game achievements. A display interface may be made available such that a player may see his achievements and total points, as well as those of others.

20 Claims, 5 Drawing Sheets

Related U.S. Application Data continuation of application No. 12/987,871, filed on Jan. 10, 2011, now Pat. No. 8,277,325, which is a continuation of application No. 11/005,768, filed on Dec. 7, 2004, now Pat. No. 7,887,419.

(51) Int. Cl.
*A63F 13/79* (2014.01)
*A63F 13/795* (2014.01)
*A63F 13/40* (2014.01)
*A63F 13/30* (2014.01)
*G06F 17/40* (2006.01)

(52) U.S. Cl.
CPC ... *A63F2300/558* (2013.01); *A63F 2300/5546* (2013.01); *A63F 2300/61* (2013.01)

(56) References Cited

U.S. PATENT DOCUMENTS

| | | | |
|---|---|---|---|
| 5,563,805 A | 10/1996 | Arbuckle et al. | |
| 5,633,484 A | 5/1997 | Zancho et al. | |
| 5,674,127 A | 10/1997 | Horstmann et al. | |
| 5,697,844 A | 12/1997 | Von Kohorn | |
| 5,708,709 A | 1/1998 | Rose | |
| 5,754,176 A | 5/1998 | Crawford | |
| 5,768,382 A * | 6/1998 | Schneier | A63F 13/12 380/251 |
| 5,779,549 A | 7/1998 | Walker et al. | |
| 5,791,992 A | 8/1998 | Crump et al. | |
| 5,846,132 A * | 12/1998 | Junkin | A63F 3/081 463/42 |
| 5,883,955 A | 3/1999 | Ronning | |
| 5,918,010 A | 6/1999 | Appleman et al. | |
| 5,945,988 A | 8/1999 | Williams et al. | |
| 5,970,143 A * | 10/1999 | Schneier | A63F 13/12 380/251 |
| 6,003,013 A | 12/1999 | Boushy et al. | |
| 6,020,884 A | 2/2000 | MacNaughton et al. | |
| 6,024,643 A | 2/2000 | Begis | |
| 6,024,943 A | 2/2000 | Ness et al. | |
| 6,071,194 A | 6/2000 | Sanderson et al. | |
| 6,081,830 A | 6/2000 | Schindler | |
| 6,106,395 A | 8/2000 | Begis | |
| 6,149,519 A | 11/2000 | Osaki et al. | |
| 6,174,236 B1 | 1/2001 | Tsuda et al. | |
| 6,174,237 B1 | 1/2001 | Stephenson | |
| 6,200,216 B1 | 3/2001 | Peppel | |
| 6,203,432 B1 | 3/2001 | Roberts et al. | |
| 6,206,782 B1 | 3/2001 | Walker et al. | |
| 6,219,047 B1 | 4/2001 | Bell | |
| 6,226,618 B1 | 5/2001 | Downs et al. | |
| 6,256,620 B1 | 7/2001 | Jawahar et al. | |
| 6,280,328 B1 | 8/2001 | Holch et al. | |
| 6,287,201 B1 | 9/2001 | Hightower | |
| 6,293,865 B1 | 9/2001 | Kelly et al. | |
| 6,302,793 B1 | 10/2001 | Fertitta et al. | |
| 6,312,336 B1 | 11/2001 | Handelman et al. | |
| 6,322,451 B1 | 11/2001 | Miura | |
| 6,334,214 B1 | 12/2001 | Horstmann | |
| 6,343,990 B1 | 2/2002 | Rasmussen et al. | |
| 6,352,479 B1 * | 3/2002 | Sparks, II | A63F 13/12 463/29 |
| 6,359,572 B1 | 3/2002 | Vale | |
| 6,371,852 B1 | 4/2002 | Acres | |
| 6,425,828 B2 | 7/2002 | Walker et al. | |
| 6,508,710 B1 | 1/2003 | Paravia | |
| 6,511,377 B1 | 1/2003 | Weiss | |
| 6,519,629 B2 | 2/2003 | Harvey et al. | |
| 6,544,126 B2 | 4/2003 | Sawano et al. | |
| 6,572,477 B2 | 6/2003 | Hightower | |
| 6,645,068 B1 * | 11/2003 | Kelly | G06Q 20/04 463/25 |
| 6,648,760 B1 * | 11/2003 | Nicastro | G09B 9/052 434/353 |
| 6,688,978 B1 | 2/2004 | Herman | |
| 6,699,124 B2 | 3/2004 | Suchocki | |
| 6,708,172 B1 | 3/2004 | Wong et al. | |
| 6,732,197 B1 | 5/2004 | Overy | |
| 6,742,032 B1 | 5/2004 | Castellani et al. | |
| 6,746,332 B1 | 6/2004 | Ing et al. | |
| 6,755,743 B1 | 6/2004 | Yamashita et al. | |
| 6,804,675 B1 | 10/2004 | Knight et al. | |
| 6,805,634 B1 | 10/2004 | Wells et al. | |
| 6,821,205 B2 | 11/2004 | Takahashi et al. | |
| 6,829,569 B1 | 12/2004 | Drucker et al. | |
| 6,839,435 B1 | 1/2005 | Iijima et al. | |
| 6,939,233 B2 | 9/2005 | Emmerson | |
| 6,941,353 B1 | 9/2005 | Lane | |
| 6,979,267 B2 | 12/2005 | Leen et al. | |
| 6,996,444 B2 * | 2/2006 | Ach, III | A63F 13/12 463/25 |
| 7,033,276 B2 | 4/2006 | Walker et al. | |
| 7,035,653 B2 | 4/2006 | Simon et al. | |
| 7,037,198 B2 | 5/2006 | Hameen-Anttila | |
| 7,056,217 B1 | 6/2006 | Pelkey et al. | |
| 7,069,308 B2 | 6/2006 | Abrams | |
| 7,086,946 B2 | 8/2006 | Yoshida | |
| 7,115,033 B1 | 10/2006 | Timperley | |
| 7,192,352 B2 | 3/2007 | Walker et al. | |
| 7,207,011 B2 | 4/2007 | Mulvey et al. | |
| 7,237,189 B2 | 6/2007 | Altenhofen et al. | |
| 7,240,093 B1 | 7/2007 | Danieli et al. | |
| 7,275,105 B2 | 9/2007 | Bloch et al. | |
| 7,311,601 B2 | 12/2007 | Anderson | |
| 7,311,608 B1 | 12/2007 | Daniell et al. | |
| 7,346,658 B2 | 3/2008 | Simpson | |
| 7,422,521 B2 | 9/2008 | Peterson | |
| 7,424,617 B2 * | 9/2008 | Boyd | G06Q 30/02 463/16 |
| 7,490,286 B2 | 2/2009 | Commarford et al. | |
| 7,614,955 B2 | 11/2009 | Farnham et al. | |
| 7,621,813 B2 * | 11/2009 | Bortnik | A63F 13/12 463/1 |
| 7,698,178 B2 | 4/2010 | Chu | |
| 7,711,847 B2 | 5/2010 | Dhupelia et al. | |
| 7,730,010 B2 | 6/2010 | Kishore et al. | |
| 7,756,926 B2 | 7/2010 | Tseng et al. | |
| 7,806,760 B2 | 10/2010 | Baerlocher | |
| 7,837,561 B2 | 11/2010 | Bortnik et al. | |
| 7,857,701 B2 | 12/2010 | Murphy et al. | |
| 7,883,413 B2 | 2/2011 | Paulsen | |
| 7,887,419 B2 | 2/2011 | Bortnik | |
| 7,914,381 B2 | 3/2011 | Blythe et al. | |
| 7,918,738 B2 | 4/2011 | Paulsen | |
| 8,025,571 B2 | 9/2011 | Cisneros et al. | |
| 8,109,828 B2 | 2/2012 | Kane et al. | |
| 8,231,472 B2 | 7/2012 | Bortnik et al. | |
| 8,235,818 B2 | 8/2012 | Bortnik et al. | |
| 8,277,325 B2 | 10/2012 | Bortnik | |
| 8,425,331 B2 | 4/2013 | Bortnik et al. | |
| 8,454,443 B2 | 6/2013 | Bortnik et al. | |
| 8,485,905 B2 | 7/2013 | Bortnik et al. | |
| 8,500,560 B2 | 8/2013 | Bortnik et al. | |
| 8,672,751 B2 | 3/2014 | Leen et al. | |
| 2001/0010046 A1 | 7/2001 | Muyres et al. | |
| 2001/0044339 A1 | 11/2001 | Cordero et al. | |
| 2002/0002510 A1 | 1/2002 | Sharp et al. | |
| 2002/0023230 A1 | 2/2002 | Bolnick et al. | |
| 2002/0035568 A1 | 3/2002 | Benthin et al. | |
| 2002/0049507 A1 | 4/2002 | Hameen-Anttila | |
| 2002/0062316 A1 | 5/2002 | Maehiro | |
| 2002/0062350 A1 | 5/2002 | Maehiro | |
| 2002/0082077 A1 | 6/2002 | Johnson et al. | |
| 2002/0082086 A1 | 6/2002 | Scallie | |
| 2002/0082939 A1 | 6/2002 | Clark et al. | |
| 2002/0083145 A1 * | 6/2002 | Perinpanathan | H04L 29/06 709/213 |
| 2002/0090996 A1 | 7/2002 | Maehiro | |
| 2002/0094851 A1 * | 7/2002 | Rheey | A63F 13/00 463/1 |
| 2002/0103019 A1 | 8/2002 | Emmerson | |
| 2002/0115488 A1 | 8/2002 | Berry et al. | |
| 2002/0119824 A1 | 8/2002 | Allen | |

(56) References Cited

U.S. PATENT DOCUMENTS

| | | |
|---|---|---|
| 2002/0142815 A1 | 10/2002 | Candelore |
| 2002/0142842 A1 | 10/2002 | Easley et al. |
| 2002/0151366 A1 | 10/2002 | Walker et al. |
| 2002/0160838 A1 | 10/2002 | Kim |
| 2002/0173349 A1 | 11/2002 | Ach, III |
| 2002/0173358 A1 | 11/2002 | Yoshida |
| 2002/0183117 A1* | 12/2002 | Takahashi ............... A63F 13/12 463/42 |
| 2002/0198949 A1 | 12/2002 | Maehiro |
| 2003/0009549 A1 | 1/2003 | Maehiro |
| 2003/0032474 A1 | 2/2003 | Kaminkow |
| 2003/0043179 A1 | 3/2003 | Gusler et al. |
| 2003/0045358 A1* | 3/2003 | Leen ....................... G07F 17/32 463/42 |
| 2003/0050115 A1 | 3/2003 | Leen et al. |
| 2003/0070176 A1 | 4/2003 | Parker et al. |
| 2003/0093168 A1 | 5/2003 | Nagaoka |
| 2003/0100363 A1 | 5/2003 | Ali |
| 2003/0104868 A1* | 6/2003 | Okita .................. G07F 17/3283 463/42 |
| 2003/0109301 A1 | 6/2003 | Chudley |
| 2003/0109305 A1 | 6/2003 | Gavin et al. |
| 2003/0114227 A1* | 6/2003 | Rubin ..................... A63F 13/10 463/43 |
| 2003/0181242 A1 | 9/2003 | Lee et al. |
| 2003/0190960 A1 | 10/2003 | Jokipii et al. |
| 2003/0204566 A1* | 10/2003 | Dhupelia ............... A63F 13/12 709/205 |
| 2003/0216962 A1 | 11/2003 | Heller et al. |
| 2003/0228908 A1 | 12/2003 | Caifa et al. |
| 2004/0077422 A1 | 4/2004 | Bryant et al. |
| 2004/0087373 A1* | 5/2004 | Choi ....................... A63F 13/12 463/42 |
| 2004/0088325 A1 | 5/2004 | Elder et al. |
| 2004/0097287 A1* | 5/2004 | Postrel .................... G07F 17/32 463/41 |
| 2004/0107283 A1 | 6/2004 | Paddon |
| 2004/0121835 A1 | 6/2004 | Willis et al. |
| 2004/0172533 A1 | 9/2004 | Demello et al. |
| 2004/0192440 A1 | 9/2004 | Evans et al. |
| 2004/0198497 A1 | 10/2004 | Yamashita et al. |
| 2004/0225386 A1 | 11/2004 | Thompson et al. |
| 2004/0229698 A1 | 11/2004 | Lind et al. |
| 2004/0242327 A1* | 12/2004 | Shahar ................... A63F 13/12 463/42 |
| 2004/0259641 A1 | 12/2004 | Ho |
| 2005/0049037 A1 | 3/2005 | Anderson |
| 2005/0054431 A1 | 3/2005 | Walker et al. |
| 2005/0054447 A1 | 3/2005 | Hiroyama et al. |
| 2005/0070359 A1 | 3/2005 | Rodriquez et al. |
| 2005/0071786 A1 | 3/2005 | Mariani et al. |
| 2005/0107157 A1 | 5/2005 | Wachtfogel et al. |
| 2005/0130742 A1 | 6/2005 | Feldman et al. |
| 2005/0137014 A1 | 6/2005 | Vetelainen |
| 2005/0137015 A1* | 6/2005 | Rogers ................... A63F 13/12 463/42 |
| 2005/0143174 A1 | 6/2005 | Goldman et al. |
| 2005/0154557 A1 | 7/2005 | Ebert |
| 2005/0170873 A1 | 8/2005 | Fishbach et al. |
| 2005/0192097 A1 | 9/2005 | Farnham et al. |
| 2005/0209002 A1 | 9/2005 | Blythe et al. |
| 2005/0223080 A1 | 10/2005 | Gray |
| 2005/0240603 A1 | 10/2005 | Bodin et al. |
| 2005/0245314 A1 | 11/2005 | Pirich et al. |
| 2005/0246638 A1 | 11/2005 | Whitten |
| 2005/0261062 A1 | 11/2005 | Lewin et al. |
| 2005/0282636 A1 | 12/2005 | O'Brien |
| 2006/0048132 A1 | 3/2006 | Chen et al. |
| 2006/0052168 A1 | 3/2006 | Shacham |
| 2006/0064761 A1 | 3/2006 | Multerer et al. |
| 2006/0075019 A1 | 4/2006 | Donovan et al. |
| 2006/0085261 A1* | 4/2006 | Chu ....................... A63F 13/12 705/14.12 |
| 2006/0085642 A1 | 4/2006 | Multerer et al. |
| 2006/0121987 A1 | 6/2006 | Bortnik |
| 2006/0121991 A1 | 6/2006 | Bortnik et al. |
| 2006/0122716 A1 | 6/2006 | Bortnik et al. |
| 2006/0136964 A1 | 6/2006 | Diez et al. |
| 2006/0172799 A1 | 8/2006 | Kane et al. |
| 2006/0183542 A1 | 8/2006 | Ng et al. |
| 2006/0191016 A1 | 8/2006 | Ostergren et al. |
| 2006/0196686 A1 | 9/2006 | Gatto et al. |
| 2006/0258463 A1 | 11/2006 | Cugno et al. |
| 2007/0077993 A1 | 4/2007 | Midgley et al. |
| 2007/0099703 A1 | 5/2007 | Terebilo |
| 2007/0111794 A1 | 5/2007 | Hogan et al. |
| 2007/0117629 A1 | 5/2007 | Fowler et al. |
| 2007/0173321 A1 | 7/2007 | Shen et al. |
| 2007/0173327 A1 | 7/2007 | Kilgore et al. |
| 2007/0191097 A1 | 8/2007 | Johnson |
| 2008/0113789 A1 | 5/2008 | Canessa et al. |
| 2009/0231515 A1 | 9/2009 | Keam et al. |
| 2011/0045912 A1 | 2/2011 | Bortnik et al. |
| 2011/0118035 A1 | 5/2011 | Bortnik et al. |
| 2011/0136575 A1 | 6/2011 | Bortnik et al. |
| 2011/0250959 A1 | 10/2011 | Bortnik |
| 2012/0009999 A1 | 1/2012 | Bortnik et al. |
| 2013/0244793 A1 | 9/2013 | Bortnik et al. |
| 2014/0162773 A1 | 6/2014 | Bortnik et al. |

FOREIGN PATENT DOCUMENTS

| | | |
|---|---|---|
| EP | 1669117 | 6/2006 |
| JP | 09-152999 | 6/1997 |
| JP | 2001-109714 | 4/2001 |
| JP | 2001-212366 | 8/2001 |
| JP | 2002-085852 | 3/2002 |
| JP | 2002-210246 | 7/2002 |
| JP | 2002-239251 | 8/2002 |
| JP | 2003-047778 | 2/2003 |
| JP | 2003-111980 | 4/2003 |
| JP | 2003-154172 | 5/2003 |
| JP | 2003-205175 | 7/2003 |
| JP | 2003-271780 | 9/2003 |
| JP | 2003-281142 | 10/2003 |
| JP | 2003-337874 | 11/2003 |
| JP | 2003-340161 | 12/2003 |
| JP | 2004-097610 | 4/2004 |
| JP | 2004-329914 | 11/2004 |
| KR | 2000/0030338 | 6/2000 |
| KR | 2001/0082566 | 8/2001 |
| KR | 20030043348 A | 6/2003 |
| KR | 2005/0003224 | 1/2005 |
| KR | 2005/0105396 | 11/2005 |
| WO | WO00/04458 | 1/2000 |
| WO | WO2005/092458 | 10/2005 |

OTHER PUBLICATIONS

Akkawi, A. et al.; "A Mobile Gaming Platform for the IMS"; Network and System Support for Games; Proceedings of $3^{rd}$ ACM SIGCOMM Workshop on System Support for Games; 2004; 8 pages.

Henshaw, J.; "Inside Xbox 360: An Interview with Jeff Henshaw"; Interview by Paul Thurrott; Paul Thurrott's Supersite for Windows; retrieved at http://www.winsupersite.com/showcase/xbox360_inside.asp; Jun. 21-Jul. 7, 2005; 12 pages.

Huang, A.; "Keeping Secrets in Hardware: the Microsoft XBox™ Case Study"; AI Memo 2002-008; Massachusetts Institute of Technology-Artificial Intelligence Laboratory; Cambridge, MA; May 26, 2002; 15 pages.

Larocque, D.; "State Pattern in C++ Applications"; Codeguru.com; retrieved at http://www.codeguru.com/cpp/misc/article.php/c3893; Sep. 17, 2001; 2 pages.

Suwalski, P; "Automotive Computing with Game Console Hardware"; Department of Systems and Computer Engineering at Carleton University; Ottawa, Ontario, Canada; Apr. 2005; 58 pages.

"Tiger Woods PGA Tour 2004"; copyright 2003.

EP Application 05110463.6; Search Report dated Feb. 28, 2006; 8 pages.

EP Application 05110463.6; Examination Report dated Jan. 10, 2007; 6 pages.

(56) References Cited

OTHER PUBLICATIONS

Japanese Patent Appln. 2005-311712; Second Office Action dated Aug. 31, 2012; 4 pages.
JP Application 2005-319924; Notice of Rejection dated Jun. 3, 2011; 5 pages.
Japanese Patent Appln. 2005-319924; Second Office Action dated Aug. 10, 2012; 3 pages.
KR Application 10-2005-97991; Notice of Preliminary Rejection dated Mar. 29, 2012; 6 pages.
EP Patent Application 05110418.0; Office Action dated Feb. 19, 2007.
CN Patent Application 200510119213.7; Office Actions dated Feb. 6, 2009; Oct. 9, 2009; Feb. 12, 2010; Jul. 29, 2010 and May 25, 2011.
JP Patent Application 2005-311712; Office Action dated Jun. 3, 2011.
Aslund, Jonas, "Authentication in Peer-to-Peer Systems", Doctoral Dissertation, May 16, 2002, 134 pages.
Wang et al., "An Architecture of Game Grid Based on Resource Router", Grid and Cooperative Computing, Lecture Notes in Computer Science, vol. 3032, Dec. 7, 2003, 8 pages.
Boga et al., "Mobile Casino", A Master Thesis, Technical University of Denmark, Aug. 2004, 153 pages.
Chang et al., "Web Browsing in a Wireless Environment: Disconnected and Asynchronous Operation in ARTour Web Express", Proceedings of the 3rd Annual ACM/IEEE International Conference on Mobile Computing and Networking, Sep. 26, 1997, 10 pages.
Non-Final Office Action mailed Jun. 23, 2008 from U.S. Appl. No. 11/005,674, 13 pages.
Reply/Response filed Nov. 18, 2008 to Non-Final Office Action mailed Jun. 23, 2008 from U.S. Appl. No. 11/005,674, 8 pages.
Amendment/Response to Final Office Action mailed Jan. 29, 2009 from U.S. Appl. No. 11/005,674, 15 pages.
Non-Final Office Action mailed Dec. 4, 2009, from U.S. Appl. No. 11/005,674, 19 pages.
Amendment/Response filed May 29, 2010 to Non-Final Office Action mailed Dec. 4, 2009, from U.S. Appl. No. 11/005,674, 17 pages.
Final Office Action mailed Sep. 15, 2010, from U.S. Appl. No. 11/005,674, 22 pages.
Response filed Nov. 2, 2010 to Final Office Action mailed Sep. 15, 2010, from U.S. Appl. No. 11/005,674, 21 pages.
Non-Final Office Action mailed May 1, 2013 from U.S. Appl. No. 11/005,674, 20 pages.
Response filed Aug. 1, 2013 to Non-Final Office Action mailed May 1, 2013, from U.S. Appl. No. 11/005,674, 12 pages.
Notice of Allowance mailed Feb. 28, 2014, from U.S. Appl. No. 11/005,674, 5 pages.
Notice of Rejection mailed on Aug. 10, 2012, from Japanese Patent Application No. 2005-319924, 5 pages.
Response filed Nov. 12, 2012 to Notice of Rejection mailed on Aug. 10, 2012, from Japanese Patent Application No. 2005-319924, 10 pages.
Response filed May 29, 2012 to Office Action, from Korean Patent Application No. 2005-0097991, 45 pages.
Notice of Final Rejection mailed Oct. 29, 2012, from Korean Patent Application No. 2005-0097991, 15 pages.
Non-Final Office Action mailed May 19, 2008, from U.S. Appl. No. 11/006,275, 10 pages.
Response/Reply filed Aug. 19, 2008 to Non-Final Office Action mailed May 19, 2008, from U.S. Appl. No. 11/006,275, 9 pages.
Final Office Action mailed Nov. 7, 2008, from U.S. Appl. No. 11/006,275, 10 pages.
Amendment/Response filed May 7, 2009 to Final Office Action mailed Nov. 7, 2008, from U.S. Appl. No. 11/006,275, 10 pages.
Notice of Allowance mailed Jul. 13, 2009, from U.S. Appl. No. 11/006,275, 7 pages.
Non-Final Office Action mailed Mar. 1, 2010 from U.S. Appl. No. 12/578,605, 6 pages.
Response filed May 19, 2010 to Non-Final Office Action mailed Mar. 1, 2010 from U.S. Appl. No. 12/578,605, 10 pages.
Notice of Allowance mailed Jul. 21, 2010 from U.S. Appl. No. 12/578,605, 7 pages.
Notice of Allowance mailed Mar. 26, 2012 from U.S. Appl. No. 12/916,246, 13 pages.
Notice of Allowance mailed Mar. 28, 2012 from U.S. Appl. No. 13/240,454, 15 pages.
Examiner-Initiated Interview Summary and Notice of Allowance mailed Apr. 3, 2013 from U.S. Appl. No. 13/535,151 16 pages.
Examiner-Initiated Interview Summary and Notice of Allowance mailed Apr. 3, 2013 from U.S. Appl. No. 13/535,161 16 pages.
Preliminary Amendment filed May 8, 2015 from U.S. Appl. No. 13/956,250, 5 pages.
Notice of Allowance mailed Jun. 1, 2015 from U.S. Appl. No. 13/956,250, 8 pages.
EP Communication for Application No. 05110418.0-2218, Reference EP36621RK900kap, Apr. 26, 2006.
EP Communication for Application No. 05110418.0-2218, Reference EP36621RK900kap, Jun. 14, 2006.
EP Rejection of request for extension of time limit issued for Application No. 05110418.0-1241, Reference EP36621RK900kap, Sep. 20, 2007.
EP Noting of loss of rights for Application No. 05110418.0-1241, Reference EP36621RK900kap, Oct. 12, 2007.
CN Notice on Reexamination for Application No. 200510119213.7, Sep. 29, 2012.
Notice of Allowance mailed Oct. 9, 2015 from U.S. Appl. No. 13/875,104, 7 pages.
Preliminary Amendment filed May 1, 2013 from U.S. Appl. No. 13/875,104, 11 Pages.
Non-Final Office Action mailed Apr. 8, 2015, from U.S. Appl. No. 13/875,104, 11 Pages.
Examination Report mailed May 18, 2015 from European Patent Application No. 05110418.0, 6 pages.
Response filed Oct. 22, 2007 to the Notification mailed Oct. 12, 2007, from European Patent Application No. 05110418.0, 19 pages.
Response filed Aug. 8, 2008 to the Non-Final Office Action mailed Apr. 16, 2008, from U.S. Appl. No. 11/005,768, 9 pages.
Amendment filed Apr. 10, 2009 in response to the Non-Final Office Action mailed Dec. 10, 2008, from U.S. Appl. No. 11/005,768, 15 pages.
Response filed Jan. 8, 2010 to the Final Office Action mailed Aug. 10, 2009, from U.S. Appl. No. 11/005,768, 15 pages.
Response filed Jul. 22, 2010 to the Non-Final Office Action mailed Mar. 25, 2010, from U.S. Appl. No. 11/005,768, 18 pages.
Response filed Sep. 5, 2011 to the Notice of Rejection mailed Jun. 3, 2011, from Japanese Patent Application No. 2005-311712, 21 pages.
Response filed Nov. 30, 2012 to the Final Notice of Rejection mailed Aug. 31, 2012, from Japanese Patent Application No. 2005-311712, 24 pages.
Response filed Jun. 10, 2009 to the First Office Action mailed Feb. 6, 2009, from Chinese Patent Application No. 200510119213.7, 10 pages.
Response filed Dec. 15, 2009 to the Second Office Action mailed Oct. 9, 2009, from Chinese Patent Application No. 200510119213.7, 12 pages.
Response filed Oct. 11, 2010 to the fourth Office Action mailed Jul. 29, 2010, from Chinese Patent Application No. 200510119213.7, 9 pages.
Request for Reexamination filed Sep. 6, 2011, from Chinese Patent Application No. 200510119213.7, 11 pages.
Notice on Reexamination mailed Sep. 29, 2012, from Chinese Patent Application No. 200510119213.7, 8 pages.
Preliminary Amendment filed Jan. 27, 2011 from U.S. Appl. No. 12/987,871, 9 Pages.
Preliminary Amendment filed Feb. 2, 2011 from U.S. Appl. No. 13/019,951, 7 Pages.
Response filed Aug. 14, 2012 to Non-Final Office Action mailed Jul. 17, 2012, from U.S. Appl. No. 13/019,951, 10 Pages.
Preliminary Amendment filed Jun. 21, 2011 from U.S. Appl. No. 13/165,211, 7 Pages.
Response filed Sep. 4, 2012 to Non-Final Office Action mailed Jul. 24, 2012, from U.S. Appl. No. 13/165,211, 13 Pages.

(56) References Cited

OTHER PUBLICATIONS

Non-Final Office Action mailed Jun. 23, 2008, from U.S. Appl. No. 11/005,674, 12 Pages.
Reply/Response filed Nov. 18, 2008 to Non-Final Office Action mailed Jun. 23, 2008, from U.S. Appl. No. 11/005,674, 11 Pages.
Final Office Action mailed Jan. 29, 2009 from U.S. Appl. No. 11/005,674, 20 Pages.
Amendment/Response filed Apr. 29, 2009 to Final Office Action mailed Jan. 29, 2009 from U.S. Appl. No. 11/005,674, 15 Pages.
Non-Final Office Action mailed Dec. 4, 2009 from U.S. Appl. No. 11/005,674, 19 Pages.
Response filed Apr. 29, 2010 to Non-Final Office Action mailed Dec. 4, 2009 from U.S. Appl. No. 11/005,674, 17 Pages.
Final Office Action mailed Sep. 15, 2010 from U.S. Appl. No. 11/005,674, 22 Pages.
Response filed Nov. 2, 2010 to Final Office Action mailed Sep. 15, 2010 from U.S. Appl. No. 11/005,674, 21 Pages.
Non-Final Office Action mailed May 1, 2013 from U.S. Appl. No. 11/005,674, 20 Pages.
Response filed Aug. 1, 2013 to Non-Final Office Action mailed May 1, 2013 from U.S. Appl. No. 11/005,674, 12 Pages.
Notice of Allowance mailed Aug. 13, 2013 from U.S. Appl. No. 11/005,674, 6 Pages.
Notice of Allowance mailed Feb. 28, 2014 from U.S. Appl. No. 11/005,674, 5 Pages.
Notice of Allowance mailed Jun. 23, 2014 from U.S. Appl. No. 11/005,674, 5 Pages.
Adams et al., "Selecting Tools for Online Communities: Suggestions for Learning Technologists," The Technology Source Archives at the University of North Carolina, <<http://technologysource.org/article/selecting_tools_for_online_communities/>>, Jul. 2003, 6 pages.
Bortnik et al., "Application Interface for Tracking Player Identity," U.S. Patent Application filed May 12, 2015, 20 pages.
Braingle, "Braingle's Online Multiplayer Checkers Ladder", <<http://www.braingle.in/games/checkers/index.php>>, Accessed May 13, 2014, 2 pages.
Braingle, "Gizzer", <<https://web.archive.org/web/20031004154555/http://www.braingle.com/view.php?user=Gizzer>>, Accessed May 13, 2014, 3 pages.
Braingle, "Online Now—Braingle's Multiplayer Checkers Ladder," <<http://www.braingle.in/games/checkers/index.php>>, Oct. 2, 2003, 3 pages.
"Phantasy Star Online IGN Guide", IGN Guides, <<http://tails.kicks-ass.net/content/sorting/clean/gaming/sega_scene_releases/sega_dreamcast_manuals/PHANTASYSTAR ONLINE IGN-GUIDE.PDF>>, Accessed May 17, 2001, 64 pages.
"The Older Gamers Forums—FAQ: User Profile Features", The Older Gamers Forum, <<http://www.theoldergamers.com/forum/faq.php?faq=vb3_user_profile>>, Accessed May 13, 2014, 6 pages.
Response filed Jul. 17, 2007 to Official Communication dated Jan. 10, 2007 from European Patent Application No. 05110463.6-2413, 19 pages.
Notice of Intention to Grant mailed Oct. 6, 2015 from European Patent Application No. 05110463.6-2413, 38 pages.
Comments on Statement of Reasons for Allowance filed Aug. 25, 2015 from US. Appl. No. 13/956,250, 2 pages.
Preliminary Amendment filed Jan. 18, 2016 from U.S. Appl. No. 14/709,851, 7 pages.

* cited by examiner

Fig. 6

Game Achievement Configuration

Please edit the Achievement list for your title and assign relative weights.

| Prio | Achievement Title | Relative Weight | Gamer Cred |
|---|---|---|---|
| 1 | Campaign Completed on Hardest | 10 | 28 (27.8) |
| 2 | Multiplayer Level 10 | 8 | 22 (22.2) |
| 3 | Campaign Completed | 7 | 19 (19.4) |
| 4 | Explored 95% of all Maps | 5 | 14 (13.9) |
| 5 | Played every Map/Mode combination | 3 | 8 (8.33) |
| 6 | Completed the 1st stage of Campaign | 2 | 6 (5.56) |
| 7 | Won a multiplayer session | 1 | 3 (2.78) |
| 8 | Unlocked a Weapon | 0 | 0 |
| 9 | Killed One Enemy | 0 | 0 |
| 8 | Created a profile | 0 | 0 |

Total: 36   Total: 100

Add New   Done

GAME ACHIEVEMENTS SYSTEM

CROSS-REFERENCE TO RELATED APPLICATIONS

This patent application is a continuation of, and claims priority from, U.S. patent application Ser. No. 13/165,211 filed on Jun. 21, 2011. U.S. patent application Ser. No. 13/165,211 is a continuation of, and claims priority from, U.S. patent application Ser. No. 13/019,951 filed on Feb. 2, 2011, now U.S. Pat. No. 8,323,112 issued Dec. 4, 2012. U.S. patent application Ser. No. 13/165,211 is also a continuation of, and claims priority from, U.S. patent application Ser. No. 12/987,871 filed on Jan. 10, 2011, now U.S. Pat. No. 8,277,325 issued Oct. 2, 2012. U.S. patent application Ser. No. 13/019,951 is a continuation of U.S. patent application Ser. No. 12/987,871, which is a continuation of, and claims priority from, U.S. patent application Ser. No. 11/005,768 filed on Dec. 7, 2004, now U.S. Pat. No. 7,887,419 issued Feb. 15, 2011, all of which are incorporated herein by reference in their entirety.

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2004, Microsoft Corporation, All Rights Reserved.

FIELD OF THE INVENTION

This invention generally relates to the field of gaming and multimedia devices. In particular, the present invention is directed to a system and method of defining and creating game achievements that may be used to convey a player's skill.

BACKGROUND OF THE INVENTION

Conventional gaming systems include a concept of unique identity, which was intended to increase player satisfaction and create a sense of community. However, while the conventional unique identity does minimize the effort required to play online, the unique identity failed to accomplish these goals. One reason for this problem is that multiple players often share an identity because there is no easy way for multiple players to identify themselves on a shared gaming device. This creates confusion as a player using a particular identity during an online gaming session, may not be the same player in the next session or from the previous session.

Further, conventional identities have failed to provide a method for conveying information about players other than a limited set of game achievements and fail to convey information about offline achievements. Thus, it is difficult to learn more about a player through the conventional unique identity. Therefore, there is a need for a unique identity that is rich and includes game achievements from both offline and online contexts to convey a player's skill. Further, the achievements should be weighted such that excelling in more difficult games results in a higher achievement level. The present invention provides such a solution.

SUMMARY OF THE INVENTION

The present invention is directed to a system and methods for providing a game achievements system. In accordance with the present invention, players are rewarded with game achievements based on mastering certain in-game facets of the games they play. Each game achievement may be conveyed in a profile as a badge or trophy, title, description, date, etc. Players may also accumulate points based on game achievements. A display interface may be made available such that a player may see his achievements and total points, as well as those of others.

In accordance with an aspect of the invention, there is provided a method of providing a game achievements system in an online gaming environment. The method includes defining system achievements; receiving definitions of predetermined in-game achievements; tracking player activity to capture occurrences of the system achievements and the predetermined in-game achievements; and aggregating occurrences of the system achievements and the predetermined in-game achievements during game play into a profile associated with a user.

In accordance with features of the invention, the method may include assigning a predetermined number of points to each system achievement, aggregating the predetermined number of system achievement points into the profile, and maintaining an aggregate number of points for the profile. Also, the method may include assigning a predetermined number of points to each in-game achievement, and aggregating the predetermined number of in-game achievement points into the profile.

In accordance with the invention, the predetermined number of points may be a weighted valued based on a total number of points available. Further, the total number of points assigned to in-game achievements for a specified game may be determined in accordance with a difficulty of the specified game. However, it may be desirable to fix the total number of points assigned to the system achievements for all games.

A display user interface may be provided where the profile is published for viewing. The display may show the aggregate number of points within a profile.

In accordance with another aspect of the invention, there is provided a system for providing game achievements in an online gaming environment. The system includes an offline player achievement tracking mechanism that tracks offline player activity during periods when a player is not communicatively connected to the online gaming environment, an online player achievement tracking mechanism that tracks online player activity during online sessions with the online gaming environment, and an aggregation mechanism that receives data regarding offline player activity and the online player activity and aggregates the offline player activity and the online player activity into a player profile.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 6 illustrates a developer user interface to specify in-game achievements.

DETAILED DESCRIPTION OF ILLUSTRATIVE EMBODIMENTS

Figure 1:
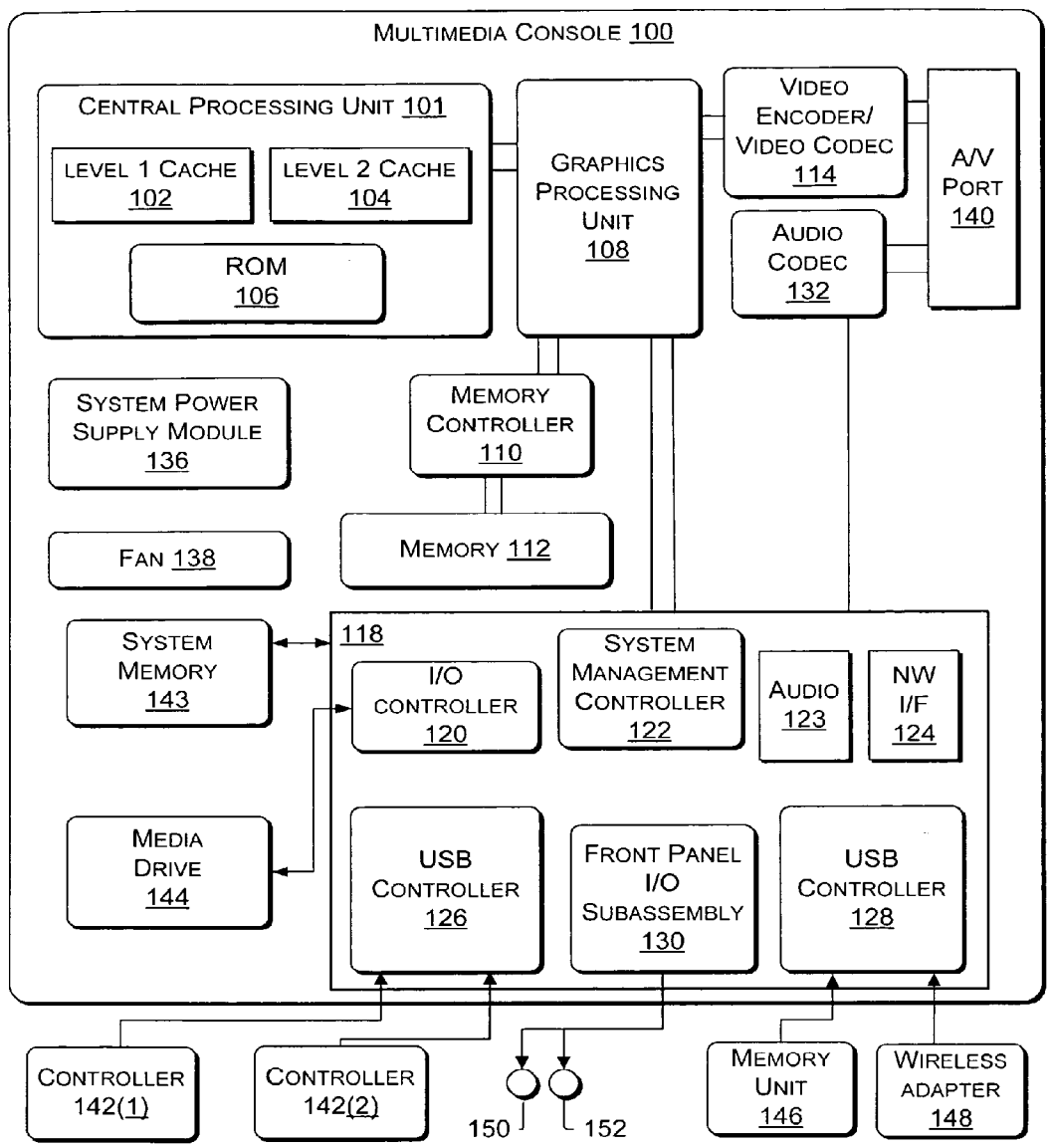
FIG. 1 is a block diagram showing a gaming console in which aspects of the present invention may be implemented.

FIG. 1 illustrates the functional components of a multimedia/gaming console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

The present invention is directed to a "Gamer Profile," which serves as a building block for services and applications that aim to create a social community of gamers and grow relationships among players. In accordance with the present invention, the Gamer Profile is the entirety of information (e.g., metadata) related to a specific user (i.e., the gamer's digital identity). The Gamer Profile is developed from a set of services that collect and expose this information in a meaningful way to the community. The Gamer Profile also provides for personalization such that users can customize and enhance their gaming experience. As will be discussed in greater detail below, the Gamer Profile consists of various components, including, but not limited to, a Gamercard, game achievements, and gamer preferences.

Figure 2:
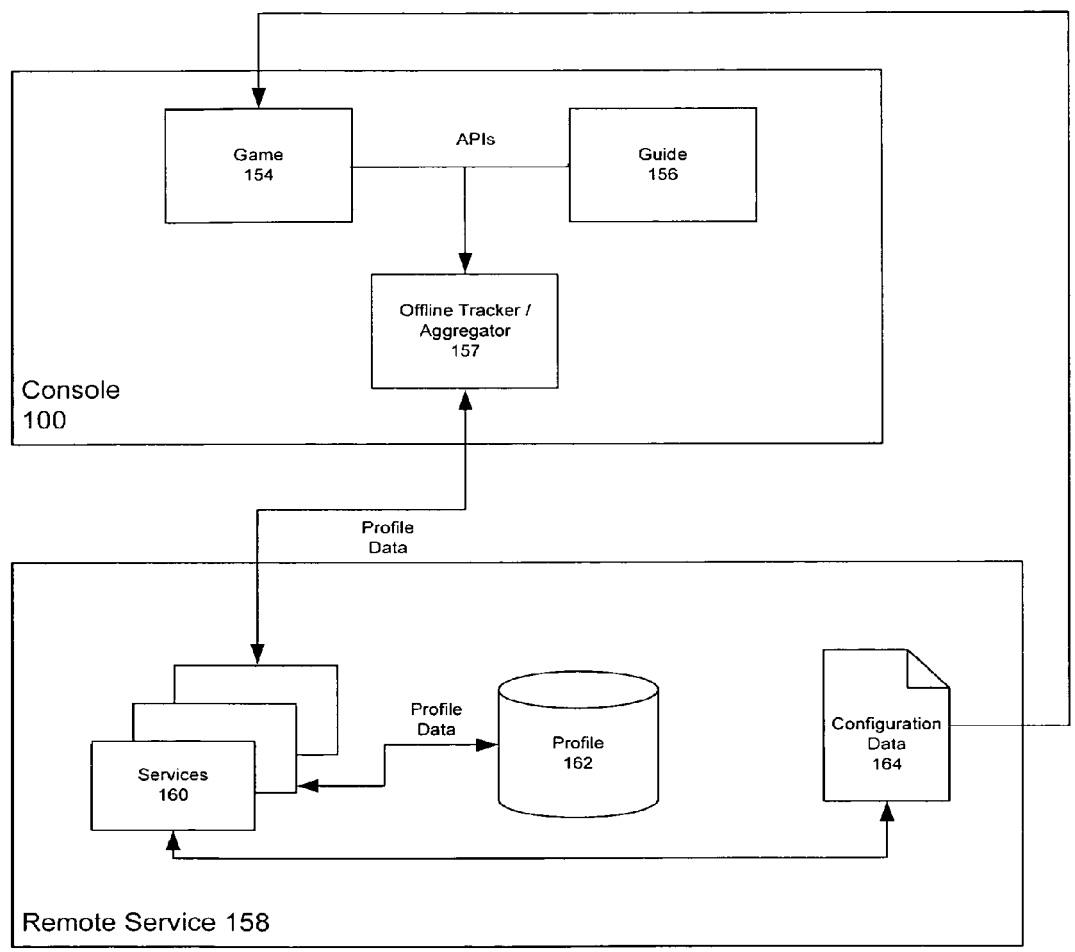
FIG. 2 illustrates an exemplary architecture in which the present invention may be implemented.

Referring to FIG. 2, there is illustrated an overview of an exemplary architecture that may be used to implement the Gamer Profile. The console 100 interacts with a remote service 158 that provides services 160 such as voice/chat, a friends list, matchmaking, content download, roaming, feedback, tournaments, voice messaging, and updates to games. The service 158 also maintains the Gamer Profiles in a profile database 162 and configuration data 164 used by the services 160 and games 154. The service 158 collects Gamer Profiles, aggregates, processes information supplied by other services 160, and fulfills real-time client requests for retrieving Gamer Profile-related services. The Gamer Profiles in the database 162 are also used by the games 154 to enable, among other things, personalization and customization, etc.

Using the console 100, the user may interact with a guide 156. The guide 156 provides an interface where the user may navigate to, and enter, various online areas and options provided by the service 158. The configuration data 164 stored by the service 158 may be used to determine features and options provided by the guide 156. When the game 154 is running, a defined set of APIs are used to call and interact with the services 160. When requesting Gamer Profile information via the APIs, the game 154 may pass a unique identifier of a user. The service 158 may return a Gamercard (discussed below), game stats, game achievements, affiliations, game settings. etc. Additional details of the various aspects of the exemplary architecture are provided below.

The console 100 includes an offline tracking mechanism 157 that tracks offline player activity during periods when a player is not communicatively connected to the service 158. The tracker/aggregator 157 tracks offline player activity during offline sessions and aggregates that data with the online player activity into the Gamer Profile 166.

Figure 3:
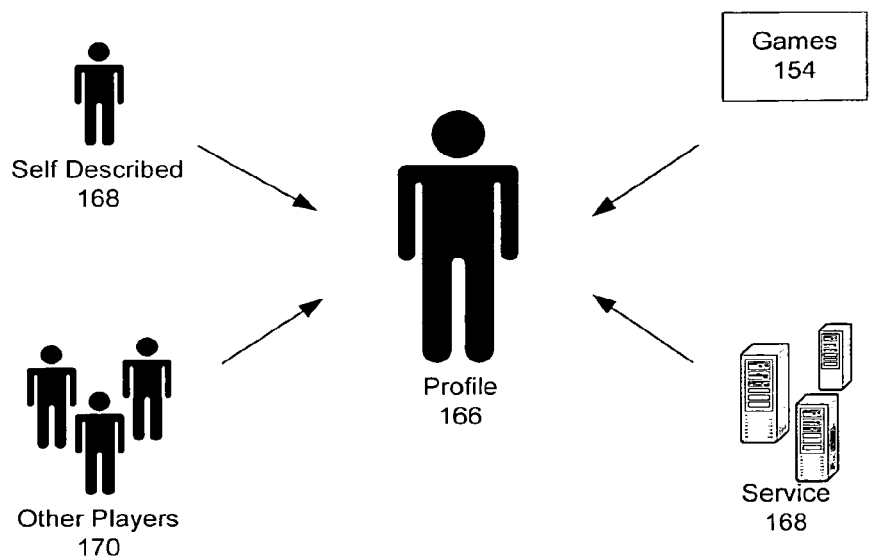
FIG. 3 illustrates sources of information that provide input to a Gamer Profile.

Referring to FIG. 3, the Gamer Profile 166 is created when a user creates a profile (selected from the guide 156) and chooses his/her unique Gamertag (a user's unique name), tile (picture/avatar associated with the user) other options during an account sign-up phase. From there, a base Gamer Profile 166 is created. The Gamer Profile 166 may then be populated from several sources. For example, the Gamer Profile 166 may include self-described data 168 from the Gamer Profile owner. Other gamers 170 can provide feedback regarding the Gamer Profile owner. The service 158 may track the gamer's online and offline activity. In addition, the games 154 may report the gamer's statistics and game achievements.

The owner of Gamer Profile can edit his/her Gamer Profile 166 directly and control who can view each section of the Gamer Profile. The Gamer Profile 166 may be edited via general fields (e.g., tile, country, language, gender, greeting, etc.) and/or system settings (e.g., voice output, controller vibration, character name, game format, game mode, etc.). Privacy/Opt-out Settings can be tuned for the Gamer Profile to, e.g., restrict presence information only to friends, allow game achievements to be visible to all, etc.

The Gamer Profile 166 may include feedback provided by other players 170. Feedback helps others learn about a particular gamer. For example, if the gamer uses foul language or aggressive play in game sessions, other gamers may submit feedback to the service 158. The feedback mechanism improves the user experience by building reputations. Players are therefore anonymous, but not unknown because of the accumulated feedback.

As noted above the Gamer Profile 166 may be used for customization and preference setting on a global level, as well as a per game level. Gamer preferences aid games 154 in choosing defaults for common settings such as game profile name, controller inversion and controller vibration, etc. For example, if a gamer likes using an inverted controller, this preference will be used for new titles as they are played. Games 154 have access to Gamer Profiles via the database 162 and services 160. In addition, game usage data can be mined to tune the game 154 to the user's particular preferences and game features updated after the initial game launch.

Figure 4:
FIG. 4 illustrates an exemplary game achievements display user interface configuration.

As noted above, the Gamer Profile 166 conveys, among other things, game achievements. Players will be rewarded with game achievements based mastering certain in-game facets of the games they play. Each game achievement may be conveyed in the Gamer Profile 166 as, e.g., a badge or trophy, title, description, date, etc., as shown in FIG. 4. Games may supply a screen snapshot or some other rich media captured at the moment the player earned a given achievement. This too may be displayed as part of the Gamer Profile 166. Players will accumulate gamer Cred (a points-based reward system) based on game achievements. As shown in FIG. 4, the player has a gamer Cred of 290. The display interface of FIG. 4 may be made available within the console 100 or via, e.g., a web browser, etc.

Figure 5:
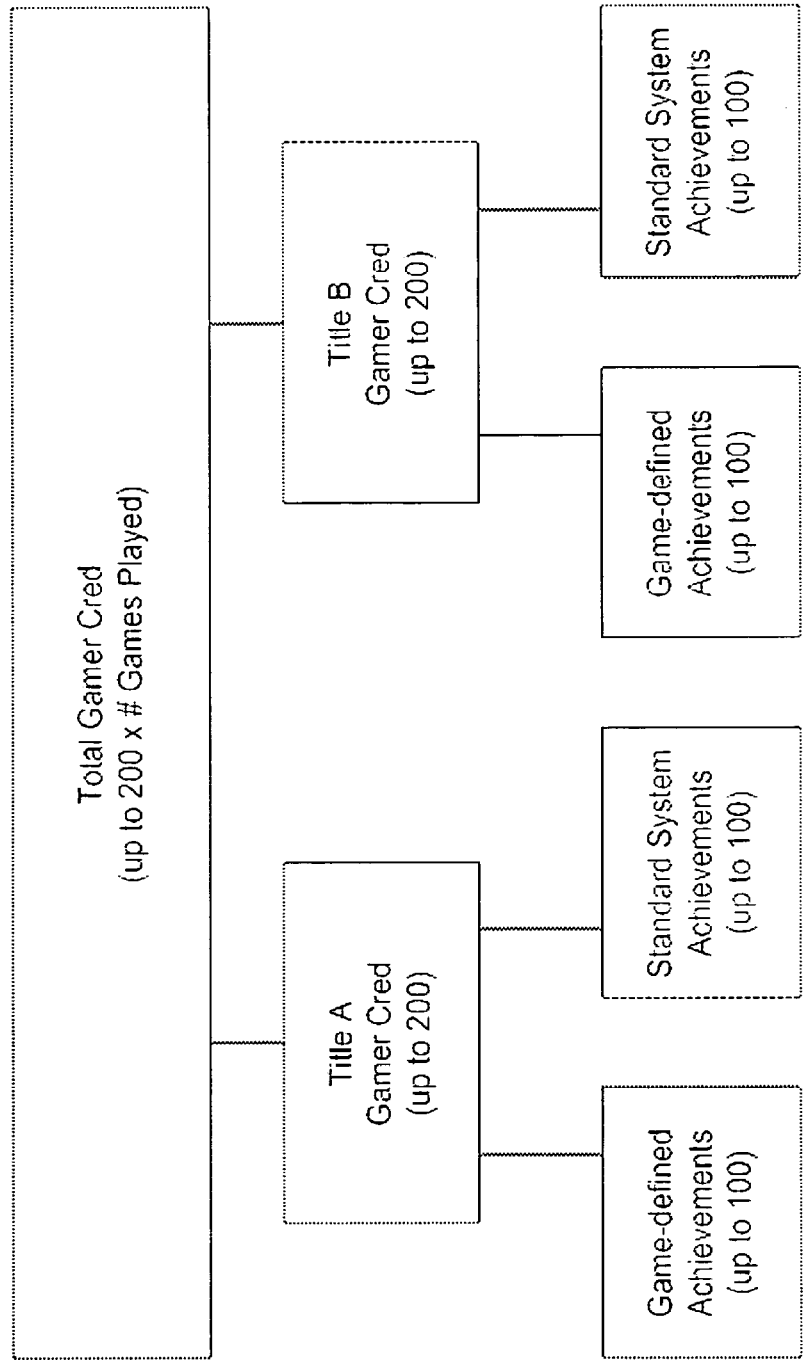
FIG. 5 illustrates the aggregation of game achievements.

Referring to FIG. 5, there is illustrated the overall relationship of the game achievements and gamer Cred in accordance with the present invention. The player's total gamer Cred is an aggregation of gamer Cred awarded through the play of one or more games (e.g., Title A and Title B). Each game may award up to a certain amount of game Cred (e.g., 200) that is divided into game-defined achievements and standard system achievements.

For example, referring to the user interface FIG. 6, Title A may be a relatively easy game to master and may award a total of 100 game-defined gamer Cred points. Within Title A, there may be several achievements (e.g., Campaign completed on hardest, multiplayer level 10, etc.) The relative weight of each of the achievements is set based on the total weight (e.g., Campaign completed on hardest is 10/36 or 27.8%). If a player completes this achievement, then the player may be awarded 27.8% of the 100 total gamer Cred points, or 28, rounded to the nearest integer value. A player is preferably credited with an achievement only once.

The standard system achievements make up the remaining 100 points in the exemplary embodiment. The standard system achievements may be applied to all games. They may include achievements such as a first sign-in to a title, completing a first session with a game, completing a first hour of a game, completing 100 sessions with a game, completing 10 hours with a game, completing a game, etc. Other system achievements may be defined as necessary. The system achievements may be weighted such that a first sign-in is awarded a relative few points, whereas completing 100 sessions is awarded a higher number points.

Developers may use a tool that include user interface of FIG. 6 to describe their game. The tool may create a configuration file that a system application on the console 100 reads when the game is loaded, a C++ header file that game code can compile against, and an XML file that is used for configuration, creation of tables, creation stored procedures, and creation of leader boards.

Although Title A and Title B can award 200 gamer Cred points, more difficult games may award 500 or 1000 (or some other number) of gamer Cred points. The total amount to be awarded on a per game basis is preferably set by the online service 158 and is not editable by the developers. This will maintain fairness and avoid the situation where Game X wants to increase sales by making the total number of gamer Cred points available a significantly higher number than other games.

Thus, the present invention provides a balanced game achievements system by weighting the difficulty of the achievements and the games. In addition, because the aggregation of game Cred is abstracted from the game to the console 100, the likelihood that a hacker or developer can overvalue achievements to inflate a player's gamer Cred is reduced.

While the present invention has been described in connection with the preferred embodiments of the various Figs., it is to be understood that other similar embodiments may be used or modifications and additions may be made to the described embodiment for performing the same function of the present invention without deviating therefrom.

What is claimed:

1. A system comprising:
 a first computing device having a first processing unit and a first memory device storing first computer executable instructions; and
 a second computing device having a second processing unit and a second memory device storing second computer executable instructions;
 wherein the first computer executable instructions, when executed by the first processing unit, cause the first processing unit to:
 receive inputs from a gamer for populating a gamer profile, the inputs identifying a gamer name of the gamer profile;
 receive further inputs from the gamer identifying specific other gamers that can receive the gamer profile;
 provide at least the gamer name of the gamer profile to a remote service on the second computing device that maintains the gamer profile;
 execute game code of a game;
 identify occurrences of a plurality of achievements, wherein the occurrences are achieved while the game is being played on the first computing device by the gamer and the occurrences include:
 an occurrence of a first individual achievement having a first title, wherein the gamer is credited a first number of points for the occurrence of the first individual achievement, and
 an occurrence of a second individual achievement having a second title, wherein the gamer is credited a second number of points for the occurrence of the second individual achievement,
 report the occurrence of the first individual achievement to the remote service on the second computing device, wherein the remote service updates the gamer profile to reflect the occurrence of the first individual achievement; and
 report the occurrence of the second individual achievement to the remote service on the second computing device, wherein the remote service updates the gamer profile to reflect the occurrence of the second individual achievement, and
 wherein the second computer executable instructions, when executed by the second processing unit, cause the second processing unit to:
 execute the remote service;
 obtain the gamer profile at the remote service via communicating with the first computing device;
 obtain identities of the specific other garners that can receive the gamer profile of the gamer;
 update the gamer profile to reflect the occurrence of the first individual achievement and the occurrence of the second individual achievement; and
 selectively provide the updated gamer profile to other computing devices associated with the specific other garners while preventing further computing devices associated with further garners from receiving the updated gamer profile.

2. The system of claim 1, wherein:
 the first computer executable instructions, when executed by the first processing unit, cause the first processing unit to:
 interact with a defined set of application programming interfaces (APIs) to communicate with the remote service.

3. The system of claim 2, wherein:
 the first computer executable instructions, when executed by the first processing unit, cause the first processing unit to:
 pass an identifier of another gamer to the remote service via one or more of the APIs; and
 receive, from the remote service, at least part of another gamer profile of the another gamer,
 the second computer executable instructions, when executed by the second processing unit, cause the second processing unit to:
 obtain the another gamer profile at the remote service via communication with another computing device of the another gamer;
 obtain an identity of the gamer from the another gamer with an indication that the gamer can receive the another gamer profile; and
 confirm that the another gamer has indicated the gamer can view the another gamer profile prior to providing the at least part of the another gamer profile to the first computing device.

4. The system of claim 3, wherein the at least part of the another gamer profile includes other achievements achieved by the another gamer during game play on the another computing device.

5. The system of claim 4, wherein:
the first computer executable instructions, when executed by the first processing unit, cause the first processing unit to:
control a display device to display the at least part of the another gamer profile, including at least names of the other achievements achieved by the another gamer.

6. The system of claim 5, wherein:
the first computer executable instructions, when executed by the first processing unit, cause the first processing unit to:
control the display device to display another gamer name of the another gamer with the names of the other achievements.

7. The system of claim 1, wherein:
the first computer executable instructions, when executed by the first processing unit, cause the first processing unit to:
track offline activity by the gamer while the first computing device is not communicatively connected to the remote service;
aggregate the offline activity into the gamer profile; and
communicate the aggregated offline activity to the remote service when the first computing device is subsequently communicatively connected to the remote service.

8. The system of claim 1, wherein the first computing device is embodied as a gaming console.

9. A computing device comprising:
a processing unit;
a network interface; and
a memory device storing instructions which, when executed by the processing unit, cause the processing unit to:
receive inputs from a gamer for populating a gamer profile, the inputs identifying a gamer name of the gamer profile;
receive further inputs from the gamer identifying specific other gamers with which the gamer profile can be shared;
using the network interface, provide at least the gamer name of the gamer profile and identities of the specific other gamers to a remote service on another computing device that maintains the gamer profile;
execute game code of a game;
identify occurrences of a plurality of achievements, wherein the occurrences are achieved while the game is being played on the computing device by the gamer and the occurrences include:
an occurrence of a first individual achievement having a first title, wherein the gamer is credited a first number of points for the occurrence of the first individual achievement, and
an occurrence of a second individual achievement having a second title, wherein the gamer is credited a second number of points for the occurrence of the second individual achievement,
using the network interface, report the occurrence of the first individual achievement to the remote service on the another computing device, wherein the remote service updates the gamer profile to reflect the occurrence of the first individual achievement; and
using the network interface, report the occurrence of the second individual achievement to the remote service on the another computing device, wherein the remote service updates the gamer profile to reflect the occurrence of the second individual achievement,
wherein the remote service selectively provides the updated gamer profile to other computing devices associated with the specific other gamers without providing the updated gamer profile to further computing devices associated with further gamers not specified by the gamer to receive the updated gamer profile.

10. The computing device of claim 9, wherein the instructions, when executed by the processing unit, cause the processing unit to:
receive further inputs identifying certain sections of the gamer profile that can be received by the specific other gamers; and
using the network interface, communicate identifiers of the certain sections that can be shared with the specific other gamers to the remote service,
wherein the remote service restricts sharing of the gamer profile to sharing the certain sections of the gamer profile with the specific other gamers.

11. The computing device of claim 9, wherein the instructions, when executed by the processing unit, cause the processing unit to:
capture a snapshot of the game at a moment when the occurrence of the first individual achievement occurs; and
using the network interface, communicate the snapshot to the remote service,
wherein the remote service shares the snapshot with at least some of the specific other garners as part of the garner profile.

12. The computing device of claim 9, wherein the instructions, when executed by the processing unit, cause the processing unit to:
perform chat communications with an individual other garner via a chat service provided by the remote service.

13. The computing device of claim 9, wherein the instructions, when executed by the processing unit, cause the processing unit to:
control a display device to display the garner name, an indication that the garner achieved the first individual achievement, and an indication that the garner achieved the second individual achievement.

14. A system comprising:
a processing unit;
a network interface; and
a memory device storing instructions which, when executed by the processing unit, cause the processing unit to:
store a garner profile for a first garner associated with a first computing device, wherein the gamer profile includes a name associated with the gamer;
using the network interface, receive, from the first computing device, identifiers of specific other gamers with which the gamer profile can be shared;
using the network interface, receive, from the first computing device, reports of occurrences of a plurality of achievements, wherein the occurrences are achieved while the game is being played on the first computing device by the gamer and the occurrences include:
an occurrence of a first individual achievement having a first title and an associated first number of points, and
an occurrence of a second individual achievement having a second title and an associated second number of points, update the gamer profile to reflect the occurrence of the first individual achievement by crediting the gamer profile with the associated first number of points;

update the gamer profile to reflect the occurrence of the second individual achievement by crediting the gamer profile with the associated second number of points; and selectively provide the updated gamer profile to other computing devices associated with the specific other gamers without sharing the updated gamer profile with further computing devices associated with further gamers that the gamer has not indicated the gamer profile should be shared with.

15. The system of claim 14, wherein the instructions, when executed by the processing unit, cause the processing unit to:

using the network interface, receive further identifiers of certain sections of the gamer profile that can be shared with the specific other gamers; and restrict sharing of the gamer profile to sharing the certain sections of the gamer profile with the specific other gamers.

16. The system of claim 14, wherein the instructions, when executed by the processing unit, cause the processing unit to:

using the network interface, share presence information of the gamer with the specific other gamers; and restrict the further gamers from obtaining the presence information of the gamer.

17. The system of claim 14, wherein the instructions, when executed by the processing unit, cause the processing unit to:

using the network interface, obtain a snapshot of the game reflecting a moment when the occurrence of the first individual achievement occurred on the first computing device; and using the network interface, share the snapshot with the specific other gamers by communicating the snapshot to the other computing devices.

18. The system of claim 14, wherein the instructions, when executed by the processing unit, cause the processing unit to:

using the network interface, provide a chat service to the gamer and the specific other gamers by sharing chat communications among the first computing device and the other computing devices.

19. The system of claim 14, wherein the instructions, when executed by the processing unit, cause the processing unit to:

provide game updates to the computing device and the other computing devices.

20. The system of claim 14, wherein the instructions, when executed by the processing unit, cause the processing unit to:

mine game usage data of the gamer; and based at least on the mined game usage data, tune the game to suit particular preferences of the gamer.

* * * * *